Sept. 7, 1948.   C. C. VAN ZANDT   2,448,936
STEP BEARING FOR GYRATORY CRUSHERS
Filed June 8, 1944

Inventor
Claiborne C. Van Zandt
by William S. Gates
Attorney

Patented Sept. 7, 1948

2,448,936

UNITED STATES PATENT OFFICE 2,448,936

STEP BEARING FOR GYRATORY CRUSHERS

Claiborne C. Van Zandt, Oconomowoc, Wis., assignor to Allis-Chalmers Manufacturing Company, Milwaukee, Wis., a corporation of Delaware Application June 8, 1944, Serial No. 539,294

8 Claims. (Cl. 241—215)

This invention relates to improved head supporting and actuating mechanism for crushers of the type having a head gyrated relative to a fixed concave by a rotating eccentric sleeve rotatably engaging a main shaft below the head, the main shaft being supported at its foot on a step bearing; and particularly to an improved step bearing having an improved lubricating and cooling system.

It is known that a gyratory crusher head may be supported from below on a fixed or adjustable step bearing surface operatively related to the frame of the crusher, by interposing a laterally and rotatably movable washer-like step member between a lower bearing surface on the foot of the main shaft and the step bearing surface, the bearing between the foot of the shaft and the washer being between spherically convex and concave surfaces on the respective members. It is also known to supply lubricant under pressure to such a bearing. However, prior to the present invention, it had been difficult to obtain satisfactory bearing operation and service life in this type of bearing, the difficulty being in part due to the high bearing loading imposed by the limited size of bearing surfaces obtainable in practice in this type of structure.

This invention provides means whereby not only may adequate oil supply to the step bearing be assured, but substantially the entire volume of oil flow to the eccentric sleeve bearings may be made to pass through the step bearing in cooling relation to its surfaces. It also provides means for utilizing an improved metal to non-metal bearing in such a structure enabling high bearing loads to be carried without danger of serious damage to the bearing.

More specifically the invention consists in so constructing and arranging the step bearing and crusher lubricating system that an excess of lubricant under pressure is supplied to a central oil space in the step washer and cooling ducts are provided in the bearing members to conduct excess lubricant in heat transferring relation to the bearing surfaces.

Still more specifically the invention provides means for conducting lubricant under pressure through a jack device to a step bearing surface formed on a movable part of the jack, within the crusher frame.

The chief object of the invention is to improve the operating characteristics and life of gyratory crusher step bearings.

Another object is to provide such an improved step bearing in combination with a gyratory crusher having an adjustable step bearing support of the hydraulic jack type.

Still another object is to provide in a gyratory crusher, a metal to non-metal step bearing with adequate provision for cooling by circulation of cooling fluid through the metal parts in heat transferring relation to their metal bearing surfaces.

The invention having the above and any further objects and advantages that may appear herein may be carried out in practice as fully described hereinbelow with reference to the accompanying drawing, in which.

Figures 1, 2, 3, 4:
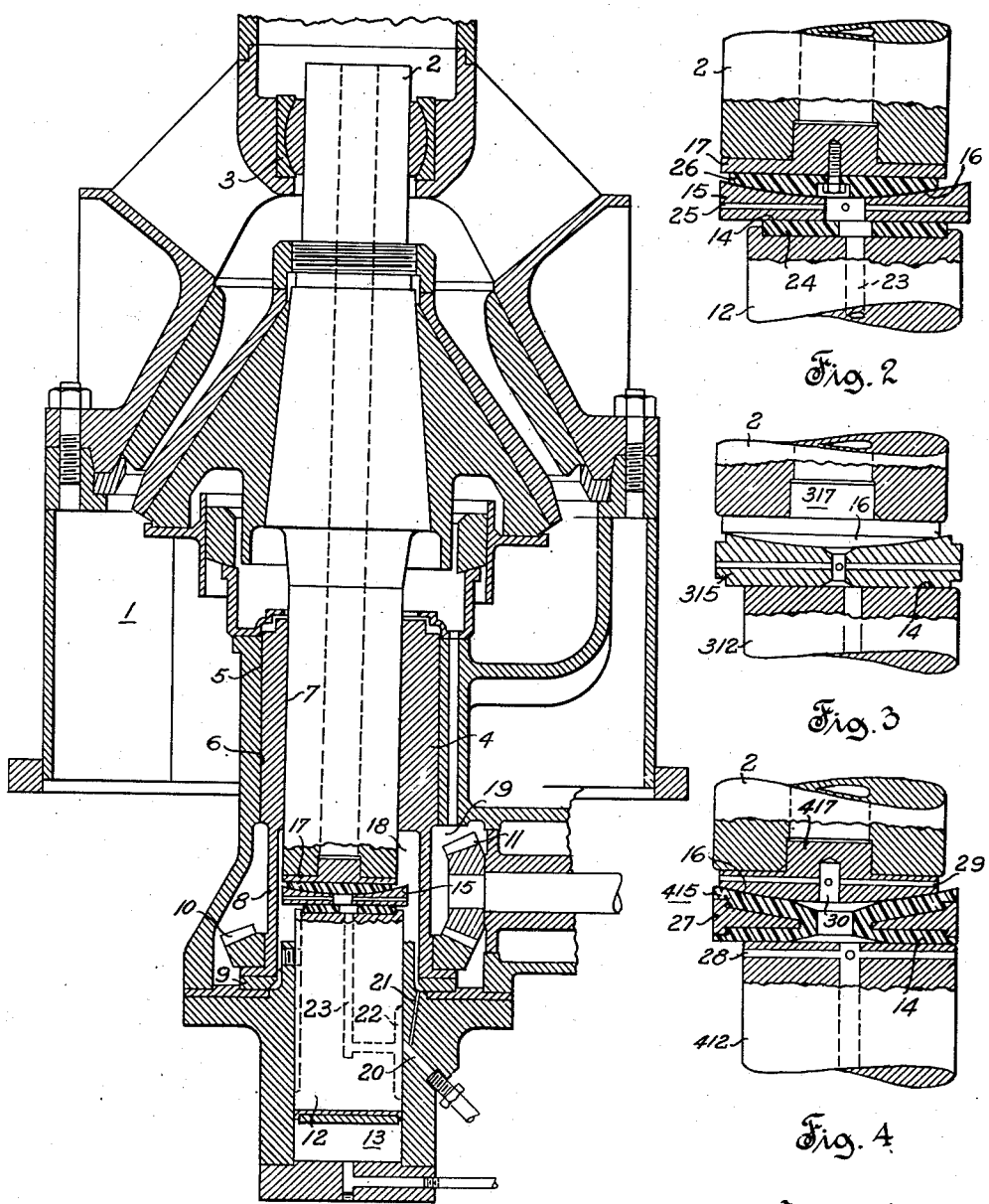
Fig. 1 is a vertical section through a crusher embodying the invention.
Fig. 2 is a fragmentary view showing the step bearing structure of Fig. 1, to an enlarged scale.
Fig. 3 is a view similar to Fig. 2 of a modified form of step bearing structure.
Fig. 4 is a view similar to Fig. 2 of another modified form of step bearing structure.

Similar reference characters indicate similar parts throughout the several views of the drawing, the reference characters referring to modified parts in Fig. 3 being transposed to the 300 series, and those referring to modified parts of Fig. 4 being transposed to the 400 series.

Referring to Fig. 1 of the drawing, a gyratory crusher 1 of a type known to the art is shown, having a main shaft 2 slidably fulcrumed near its upper end in a bearing 3, and gyrated at its lower end about the fulcrum 3 by an actuating eccentric sleeve 4 having an external cylindrical bearing surface 5 journaled in a coaxial cylindrical outer eccentric sleeve bearing 6 in the frame. The internal bore 7 of the eccentric sleeve 4 is eccentric to and has its axis inclined relative to bearing surface 5. An extension 8 of the eccentric sleeve is rotatably supported by an annular supporting bearing 9, and carries the toothed ring gear 10 which is driven by driving pinion 11.

The main shaft 2 is supported from below on any suitable axially adjustable step 12 mounted on the frame in a manner to house in the lower end of the eccentric sleeve 4. It will be noted that step 12 may be the plunger of a hydraulic jack cylinder 13 closing the frame below annular bearing 9, and may be adjustable axially by suitable means for supplying and removing hydraulic fluid from the space below plunger 12. The step 12 may have a flat upper bearing surface 14 on which a washer 15 with a flat lower bearing surface is carried in laterally slidable relation. The washer 15 is spherically concave on its upper surface to fit a convex lower bearing surface 16 at the lower end of main shaft 2. Bearing surface 16 is preferably formed on a mushroom shaped detachable foot piece 17, secured in any desired manner to the lower end of shaft 2, but may, alternatively, be formed directly on the end of shaft 2.

It will be noted that, in the structure described hereinabove and shown in Fig. 1 of the drawing, the space within the frame below the eccentric sleeve 4 is coaxially divided by the eccentric sleeve 4 into an inner chamber 18 and an outer chamber 19 having no intercommunication except through the rotary seal formed between the supporting bearing 9 and eccentric sleeve 4, and through the inner eccentric bearing between shaft 2 and eccentric sleeve bore 7, and thence serially through the outer eccentric sleeve bearing 6. The inner chamber 18 serves as a pressure lubricant reservoir for oiling the step bearing and eccentric sleeve bearing surfaces. This structure, broadly speaking, is already known and forms no part of the present invention, except as combined in a novel manner with other features, as hereinafter described.

According to the present invention a passage 20 is provided in the wall of cylinder 13, opening through its inner surface to form a port. A branch passage 21 of restricted size may or may not be provided leading off to inner chamber 18 for a reason to be more fully described hereinafter. An elongated recess 22 in the side of plunger 12 is arranged to communicate with passage 20 in all adjusted positions of the plunger 12, and is connected by a passage 23 in the body of the plunger 12 to an opening in about the center of step bearing surface 14, in communication with the space within the inner opening of washer 15 for reasons described below in connection with Figs. 2, 3 and 4 of the drawing.

Figs. 1 and 2 of the drawing show a preferred form of step bearing structure according to the invention, in which the bearing surface 14 is formed on a flat, washer-like insert of nonmetallic bearing material such as a laminated composition of textile fabric impregnated with a thermo setting phenolic resin. Suitable bearing materials of high strength are well known and available to the public. Step washer 15 may be formed of steel or other suitable metal and is provided with a plurality of radial passages 25 connecting its central opening with the inner chamber 18 through the periphery of the washer. The bearing surface 16 is formed on a lenticular insert 26 of substantially plano-convex form made of material similar to that of insert 24. If satisfactory lubrication of the step bearing surfaces 14 and 16 and washer 15 is to be maintained, it has been found that cooling must be provided. This cooling is accomplished according to this invention by circulating substantially all the lubricant required to lubricate both the step and eccentric bearings through passages 20, 22, 23 and 25 to the inner space 18. The excess of lubricant over that required for step bearing lubrication passes through passages 25 in heat conducting relation to the surfaces of the washer 15 and keeps the bearing surfaces sufficiently cool to allow satisfactory lubrication under tremendous bearing loads.

Fig. 3 shows a simpler embodiment of the invention, in which a bronze washer 315 is used between steel surfaces 134 and 316.

Fig. 4 shows a modified, metal to non-metal, step bearing, in which washer 415 is formed of material similar to inserts 24 and 26 of Figs. 1 and 2 described above, with a metallic reinforcing ring or skeleton 27. In the form shown in Fig. 4, it will be noted that no radial passages are provided in washer 415. This is for the reason that the non-metallic bearing material is a poor heat conductor. In this form of the invention, cooling is achieved by forming cooling passages 28 in the metal body of plunger or step 412 near its surface 14, communicating with the inner opening of washer 415 and lubricant passage 23 and opening outwardly through the periphery of plunger 412 into inner chamber 18. Further cooling passages 29 may be provided in the metal of the foot piece 417 near the surface 16, communicating at their inner ends through a recess 30 in the foot piece 417 of the shaft 2, with the inner opening of washer 415, and at their outer ends with inner chamber 18.

Lubricant under pressure in amounts in excess of lubrication requirements can, by applicant's invention, be led centrally through an adjustable step 12 to lubricate and cool the step bearing carried thereon and lubricate the eccentric bearings. A restricted passage 21 may be formed in the frame to bypass a predetermined portion of the oil around the step bearing directly to inner chamber 18, if desired.

In operation, an adequate supply of lubricating oil may be forced through passage 20 at such a rate as will provide a lubricant pressure of, for example, 5 to 10 pounds per square inch within the washer 15 and inner chamber 18. All or at least the larger part of the lubricant flow to inner chamber 18 will pass through cooling passages 25, or 28 and 29, in efficient heat transferring relation to all metal surfaces of the step bearing, keeping its temperature down to a degree suitable for effective lubrication. This supply may be continuously maintained through passages 20 and 22 in the relatively moving parts 12 and 13 of the adjustable step mechanism.

It is to be understood that the invention is not intended to be limited to the precise details of construction and operation illustrated and described, but is intended to include such modifications and equivalents within the scope of the appended claims as may occur to persons skilled in the art to which the invention appertains.

It is claimed and desired to secure by Letters Patent:

1. In a gyratory crusher of the type having an axially slidable main shaft member with its lower end gyrated about an axis of gyration by a gyrating mechanism and supported by a step bearing having an upwardly spherically surfaced laterally movable step washer member supported in thrust bearing relation on a substantially flat upper bearing surface of a step member, pressure lubricating and cooling means for said step bearing, comprising means forming a continuous passage for supply of lubricant under pressure from the frame of the crusher through the upper bearing surface of said step member directly to the space within the inner opening of said step washer member, and a plurality of ducts fully walled in by and extending through the body of said washer member from said inner opening outwardly in angularly spaced radiating relation and opening through the periphery of said washer member, said ducts serving to conduct cooling and lubricating fluid in heat transferring relation to the bearing surfaces of said washer member to cool said washer and lubricate the shaft gyrating mechanism.

2. In a step bearing for the gyrating lower end of a gyratory crusher main shaft, a substantially flat upwardly facing thrust bearing surface operatively related to the crusher frame for axially supporting said shaft, a step washer having a substantially flat lower bearing surface for thrust engagement with said thrust bearing surface and an upwardly spherical bearing surface for operatively engaging a cooperating spherical thrust bearing surface of the said shaft, a passage extending through said substantially flat bearing surface, means for supplying lubricant under pressure through said passage to the central opening of said washer, and a plurality of ducts formed in the body of said washer generally parallel to and separated from the said bearing surfaces and extending from said central opening outwardly in angularly spaced radiating relation and opening through the periphery thereof.

3. In a gyratory crusher having an axially slidable main shaft member fulcrumed near its upper end and having its lower end operatively engaging an inner eccentric bearing of an eccentric sleeve journaled in a cylindrical bearing in the frame coaxial with the axis of the crusher, the lower portion of said frame forming a housing for the eccentric sleeve and actuating mechanism, an annular bearing on said frame engaging the lower end of said eccentric sleeve in supporting relation to divide the said housing concentrically into an inner chamber and an outer chamber communicating only through said annular eccentric supporting bearing and serially through the inner and outer eccentric sleeve bearings, a step bearing for the foot of said head shaft within said inner chamber, comprising an axially adjustable step member having a substantially flat upper bearing surface, an upwardly spherically surfaced washer member formed of heat conducting material and supported on said upper bearing surface for operatively supporting the foot of said shaft member, a pressure lubricant passage through said housing to said inner chamber, a portion of said passage being formed in said step member for supplying lubricant under pressure to the central opening of said washer member to lubricate the bearing surfaces thereof, and a plurality of ducts formed in the body of said washer member and connecting said central opening and said inner chamber to cool said washer member and supply lubricant under pressure to said inner chamber and eccentric sleeve bearings, said ducts being fully walled in and separated laterally from said bearing surfaces and from each other by the material of said washer member.

4. In a gyratory crusher of the type having an axially slidable main shaft with its lower end gyrated about an axis of gyration by a gyrating mechanism and supported by a step bearing having a laterally movable washer member supported in thrust bearing relation on the substantially flat upper bearing surface of a step member, said shaft being of massive steel construction and being provided on its lower end with a detachable lenticular thrust bearing liner of laminated thermosetting phenolic resin material, and said step member being of steel provided with a substantially flat detachable thrust beaing liner of material similar to that of said lenticular liner forming said upper bearing surface, said movable washer member being of metal, and pressure lubricating and cooling means therefor, comprising means for supplying lubricant under pressure to the space within the inner opening of said washer member, and a plurality of angularly spaced radiating cooling ducts fully walled in by and extending through the body of said washer member from said inner opening outwardly through the periphery of said washer member to cool said washer member and lubricate the shaft gyrating mechanism.

5. In a gyratory crusher step bearing, a downwardly convex member, a flat member and an interposed washer member having a concave bearing surface and a flat bearing surface on opposite sides thereof engaging said convex and flat members, respectively, in thrust bearing relation, the bearing surfaces of said washer member being formed of one material and those of said convex and flat members being of a dissimilar material, one of said materials being a non-metallic bearing material and the other a metal, means supplying lubricant under pressure to the central opening of said washer member, and a plurality of angularly spaced radiating ducts formed in the metal body of a member having a metal bearing surface and spaced from said bearing surfaces by the metal thereof for conducting lubricant under pressure from said central opening outwardly through the periphery of the respective member.

6. In the structure of claim 5, said washer having non-metallic bearing surfaces and said convex and flat members being formed of metal and having said cooling ducts formed in the bodies thereof, said ducts being in communication at one end with said central opening of said washer and extending outwardly through the peripheries of said convex and flat members.

7. In a gyratory crusher a step bearing for the foot of a gyratory axially slidable main shaft member comprising a hydraulic jack cylinder mounted on the lower end of the crusher frame, a step forming piston member fitting in said cylinder and axially supported therein by hydraulic fluid pressure, said piston member having a substantially flat upper bearing surface in a plane normal to the axis of said crusher, a step washer member slidable laterally on said upper bearing surface and having a thrust bearing upper surface for operative engagement with the foot of said main shaft member, a port in said cylinder, a pressure lubricant passage in said piston communicating with said port in all adjusted positions and terminating in said flat upper surface of said piston member in communication with the central opening of said washer member for conducting lubricant under pressure to said opening.

8. The structure of claim 7 in which cooling passages are formed in the body of at least one of said members adjacent a thrust bearing surface thereof, communicating at one end with the central opening of said washer member and opening outwardly through the periphery of such member within the frame of said crusher.

CLAIBORNE C. VAN ZANDT.

REFERENCES CITED

The following references are of record in the file of this patent:

UNITED STATES PATENTS

| Number | Name | Date |
|---|---|---|
| 313,818 | Fraser | Mar. 10, 1885 |
| 464,463 | McCully | Dec. 1, 1891 |
| 650,097 | Rotter | May 22, 1900 |
| 803,678 | Emmet | Nov. 7, 1905 |
| 1,362,754 | Sperry | Dec. 21, 1920 |
| 1,700,856 | Schein | Feb. 5, 1929 |
| 1,929,836 | Brown | Oct. 10, 1933 |
| 2,147,833 | Fahrenwald | Feb. 21, 1939 |
| 2,158,779 | Rumpel | May 16, 1939 |
| 2,288,069 | Browning | June 30, 1942 |
| 2,305,616 | Gruender | Dec. 22, 1942 |
| 2,349,790 | Johnson | May 23, 1944 |